(12) United States Patent
Leynaert et al.

(10) Patent No.: US 8,803,496 B2
(45) Date of Patent: Aug. 12, 2014

(54) METHOD OF LIMITING A CURRENT SUPPLIED BY A DC POWER SUPPLY

(75) Inventors: François-Noël Leynaert, Montmorency (FR); Etienne Annee, Courbevoie (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 265 days.

(21) Appl. No.: 13/360,936

(22) Filed: Jan. 30, 2012

(65) Prior Publication Data

US 2012/0194165 A1 Aug. 2, 2012

(30) Foreign Application Priority Data

Feb. 1, 2011 (FR) ...................................... 11 50790

(51) Int. Cl.
*H02M 3/156* (2006.01)
(52) U.S. Cl.
USPC ............................ 323/282; 307/131; 361/187
(58) Field of Classification Search
USPC ........... 307/131; 361/187; 327/110; 323/282, 323/286–287
See application file for complete search history.

(56) References Cited

U.S. PATENT DOCUMENTS

| | | | | |
|---|---|---|---|---|
| 4,978,865 A | * | 12/1990 | Hartmann et al. | 307/140 |
| 5,113,085 A | | 5/1992 | Schäfer et al. | |
| 5,313,153 A | * | 5/1994 | Locher et al. | 323/284 |
| 8,384,362 B2 | * | 2/2013 | Cheng | 323/222 |
| 2009/0051336 A1 | * | 2/2009 | Hartlieb et al. | 323/282 |
| 2009/0231889 A1 | * | 9/2009 | Saint-Pierre | 363/44 |

FOREIGN PATENT DOCUMENTS

EP 0 606 089 A1 7/1994

* cited by examiner

*Primary Examiner* — Harry Behm
(74) *Attorney, Agent, or Firm* — Sughrue Mion, PLLC

(57) ABSTRACT

The invention relates to a method of limiting a current $i_{dc}$ supplied by a DC power supply, the method comprising:

interposing a switching stage between the power supply and a load, the switching stage including a controllable switch in series with a freewheel diode; and periodically controlling the switch so that for each period of duration T, the following averaged quantity $$\frac{1}{T}\int_o^\tau i \cdot dt$$

is calculated in which i is a current that is an image of the power supply current $i_{dc}$, the averaged quantity being reset to zero at the beginning of each period, with the switch being caused to be closed so long as said averaged quantity remains below a predetermined current threshold $i_{thresh}$, and with the switch being caused to be open, otherwise.

3 Claims, 3 Drawing Sheets

METHOD OF LIMITING A CURRENT SUPPLIED BY A DC POWER SUPPLY

The invention relates to a method of limiting a current supplied by a direct current (DC) power supply.

TECHNOLOGICAL BACKGROUND

For various reasons, in particular for reasons of saving energy or protecting powered equipment, it is desirable to limit the current from a DC power supply.

In particular, aircrafts are known that are provided with a power bus for delivering alternating current (AC) power generated by the alternators of the aircraft to electromechanical actuators that may consume said power. A converter transforms the AC power into DC power, and it is appropriate to ensure that the power consumed by the actuators is limited in order to save power.

Various types of power limitation are known. In general, they rely on servo-control based on a model of the load to be powered. The servo-control seeks to limit the torque setpoint of the motor as a function of the speed of rotation of the motor, or else to limit the speed setpoint as a function of the torque of the motor, so as to limit the power it consumes.

Those methods present the drawback of depending on the load that is to be powered.

OBJECT OF THE INVENTION

An object of the invention is to provide a method of limiting current that does not depend on the load to be powered.

BRIEF SUMMARY OF THE INVENTION

The invention provides a method of limiting a current $i_{dc}$ supplied by a DC power supply, the method comprising:

interposing a switching stage between the power supply and a load, the switching stage including a controllable switch in series with a freewheel diode; and periodically controlling the switch so that for each period of duration $T$, the following averaged quantity $$\frac{1}{T}\int_o^T i \cdot dt$$

is calculated in which i is a current that is an image of the power supply current $i_{dc}$, the averaged quantity being reset to zero at the beginning of each period, with the switch being caused to be closed so long as said averaged quantity remains below a predetermined current threshold $i_{thresh}$ and, with the switch being caused to be open, otherwise.

If the averaged quantity is less than the current threshold, then the switch is never opened, and the circuit behaves as though there were no limiting. It is only when the averaged quantity reaches the threshold that the switch is opened (at an instant $t_{open}<T$). While the switch is open, the current delivered to the load then decreases by flowing around the circuit constituted by the freewheel diode and the inductive component of the load. The mean current during the period is thus limited.

Preferably, the switching stage is followed by a differential filter stage that serves to output DC with very little harmonic distortion.

Preferably, the switch control signal is an output from a comparator that compares the output from a resettable integrator with a current setpoint equal to the threshold current $i_{thresh}$, the integrator receiving as input the current that is an image of the power supply current.

The switch may thus be controlled in analog manner, and in a manner that is purely passive. Current limitation does not depend on an electrical model of the load or on a model of its electrical losses, such that the method of the invention is particularly robust.

The current limitation method of the invention may be used in a variety of applications. In a first application, the limitation method is applied to a power converter such as an inverter, e.g. an inverter used for powering a brushless DC motor. Such an inverter has a plurality of arms (at least as many arms as the motor has phases to be powered), each of which arms has two switching cells connected in series, each cell comprising a controllable switch connected in parallel with a diode. The switching cells serve to deliver current to the phases of the motor as a function of the angular position of the rotor of the motor. In the invention, the switching cells are controlled to interrupt the current using the limitation method of the invention so as to limit the current supplied to the phases of the motor, with the particular switching cell that is to be controlled in application of the limitation method being selected as a function of the angular position of the rotor.

DESCRIPTION OF THE FIGURES

The invention can be better understood in the light of the following description of a particular implementation of the method of the invention, given with reference to the figures of the accompanying drawings, in which.

DETAILED DESCRIPTION OF THE INVENTION

The invention applies to limiting the current delivered by a DC power supply, e.g. an aircraft alternator delivering AC that is conveyed by a power network and rectified by a rectifier prior to being used by consumers connected to the network.

Figure 1:
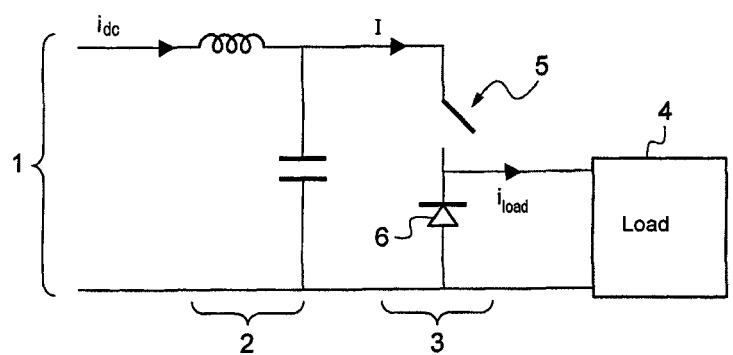
FIG. 1 is an electrical circuit diagram of a switching stage needed for implementing the method of the invention.

As shown in FIG. 1, the network 1 delivers a DC current $i_{dc}$ that is initially processed by an input differential filter 2 to deliver a filtered current I. A switching stage 3 is located downstream from the filter 2 to deliver a load current $i_{load}$ which is limited by arrangements described in detail below for powering a load 4 that includes an inductive component, e.g. an electric motor winding. The switching stage 3 includes a controlled switch 5 in series with a freewheel diode 6 having the load 4 connected across its terminals.

Current is limited as follows. On each time period of duration T, the following averaged quantity is calculated:

$$\bar{i}(t) = \frac{1}{T}\int_o^t I \cdot dt$$

Figure 2:
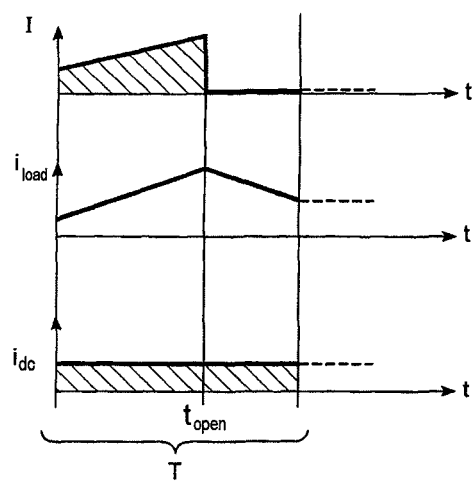
FIG. 2 is a graph showing currents upstream and downstream from the switching stage.

So long as this quantity is less than a predetermined threshold current $i_{thresh}$, the switch 5 is kept closed. Thus, the current $i_{load}$ that sees the load is then equal to the current I leaving the filter 2. If during the period T, the quantity $$\bar{i}(t) = \frac{1}{T}\int_o^t I \cdot dt$$

reaches the threshold current $i_{thresh}$, then the switch 5 is open, thereby isolating the load 4 from the remainder of the network. The current $i_{load}$ then results from current flowing through the closed circuit made up of the load 4 with its inductive component and the freewheel diode 6, with this current diminishing progressively until, once the end of the period T has been reached, the switch 5 is closed again and the calculation of the quantity $$\bar{i}(t) = \frac{1}{T}\int_o^t I \cdot dt$$

is reinitialized. The result of this periodic opening can be seen in the graph of FIG. 2, in which there can be seen, at the top, the current I leaving the filter stage, in the middle, the current $i_{load}$ as seen by the load, and at the bottom, the (idealized) current $i_{dc}$ actually consumed by the load.

In the figure, there can be seen the moment $t_{open}$ at which the switch 5 is opened. The current I then becomes zero after this moment. The current $i_{load}$ as seen by the load faithfully tracks the current I and then decreases after the moment $t_{open}$. Finally, the current $i_{dc}$ is such that the shaded area under the curve for the current I and the shaded area under the curve for the current $i_{dc}$ are substantially equal.

This method of limitation thus serves to control the maximum value reached by the current $i_{dc}$. Naturally, fine control over the current $i_{dc}$ depends on the characteristics of the filter stage and on the impedances of the network. If the filter stage does not present resonance (and thus no amplification), then the maximum value on average for the current $i_{dc}$ over a period T can be guaranteed. If, furthermore, the filter stage has a cutoff frequency that is well below the chopping frequency 1/T, then the maximum peak value of the current $i_{dc}$ is also guaranteed.

Figure 3:
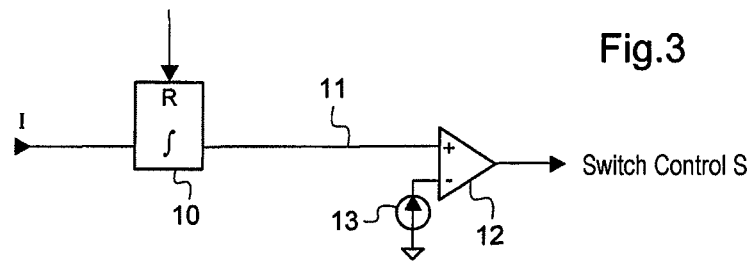
FIG. 3 is an electrical circuit diagram of the control for the switch of the switching stage.

An example of a circuit for controlling the switch 5 is shown in FIG. 3. The current I is supplied as input to an integrator 10 that is resettable (via an input R), which integrator integrates the current supplied thereto. Ignoring a factor of T, the output 11 from the integrator 10 is equal to the quantity:

$$\bar{i}(t) = \frac{1}{T}\int_o^t I \cdot dt$$

The output from the integrator is supplied to a first input of a comparator 12 that compares the value supplied in this way with a predetermined setpoint 13 that is an image of the threshold current $i_{thresh}$, which is supplied to the second input of the comparator 12. The output from the comparator 12 thus takes two values, depending on whether the first input is less than or greater than the second input, thereby enabling the switch 5 to be controlled. At that end of the period T, the output 11 from the integrator 10 is reset to zero.

Figure 4A:
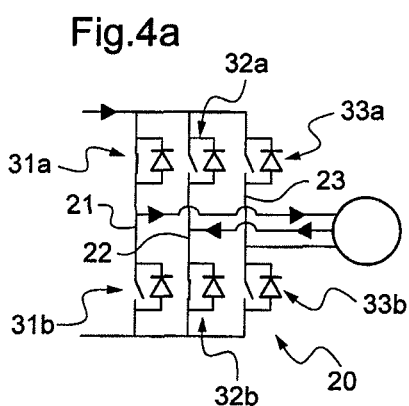
FIGS. 4a and 4b are diagrams of an inverter associated with a brushless DC motor, showing how the method of the invention may be implemented in a power converter in a first variant implementation.

This method of power limitation may be implemented in power converters, e.g. an inverter powering a brushless DC motor. As shown in FIG. 4a, such an inverter 20 has arms 21, 22, and 23 (three arms here because the motor has three phases) each comprising two switching cells in series (respectively 31a & 31b, 32a & 32b, 33a & 33b), each comprising a controlled switch (e.g. an insulated gate bipolar transistor (IGBT)) connected in parallel with a diode.

It is known that the switching cells serve to direct the current powering the motor to the appropriate phase as a function of the angular position of the rotor of the motor. However the switching cells may also serve to limit the current consumed by the motor by using the method of the invention.

Implementing the limitation method of the invention in an inverter is explained below with reference to FIGS. 4a and 4b. It is assumed that the position of the rotor is such that it is appropriate to power the phases associated with the first arm 31 and the second arm 32. At the beginning of a period T, the switch of the cell 31a and the switch of the cell 32b are both closed, thereby enabling a current $i_{load}$ to flow through the phase of the motor that is associated with the first arm 31 and an opposite current to flow through the phase of the motor associated with the second arm 32. The other switches in the other cells are kept open. This is the situation shown in FIG. 4a.

Figure 4B:
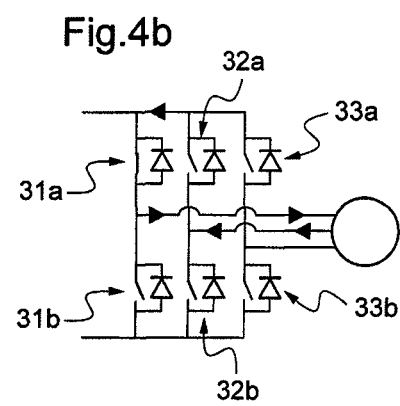

Calculation of the quantity $$\bar{i}(t) = \frac{1}{T}\int_o^t I \cdot dt$$

is initialized, and when it reaches a predetermined threshold, the switch in the cell 32b is opened, as shown in FIG. 4b. Thus, all of the switches in the lower cells (31b, 32b, 33b) are open. The motor phases in question are then looped via a circuit including the diode of the cell 32a, which then acts as the freewheel diode of the FIG. 1 switching stage. At the end of the period T, the switch of the cell 32b is reclosed and the calculation of the averaged quantity is reinitialized, thereby returning to the situation of FIG. 4a.

Figure 5A:
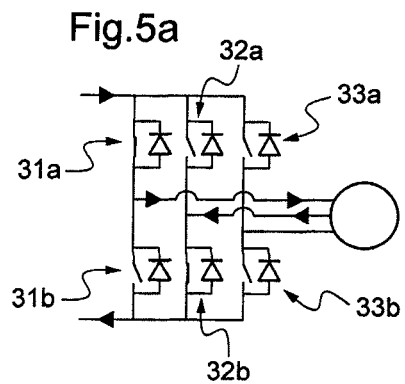
FIGS. 5a and 5b are diagrams of an inverter associated with a brushless DC motor showing how the method of the invention can be implemented in a power converter in a second variant implementation.
Figure 5B:
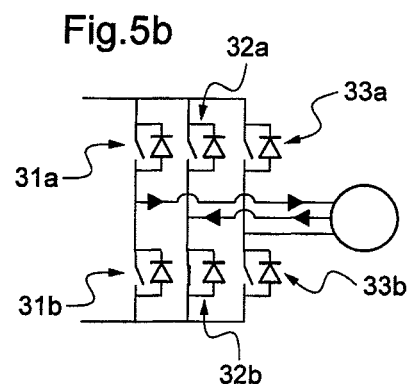

Alternatively, as shown in FIGS. 5a and 5b, it is possible to keep the switch of the cell 32b closed, and then to close and open the switch of the cell 31a. It is then the diode of the cell 31b that acts as a freewheel diode when the switch of the cell 31a is opened.

Naturally, the switching cells concerned in implementing the limitation method of the invention depend on which phases are to be powered, and thus on the angular position of the rotor. Thus, the cells 32a and 33b are paired respectively for powering the second and third phases, and the cells 33a and 31b are paired for powering the third and first phases.

The method of the invention is also applicable to switching or chopping techniques in which the switch of the same arm is closed when the switch of a cell is opened by the method of the invention.

Figure 6:
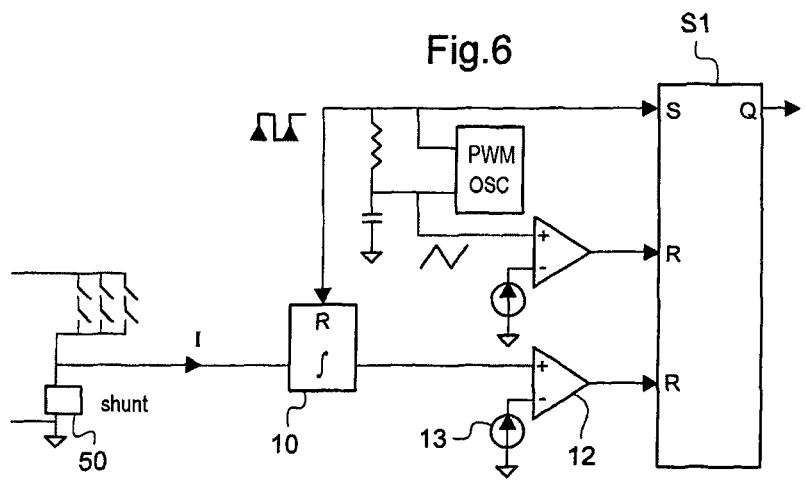
FIG. 6 is an electronic circuit diagram showing the current limitation of the invention integrated with a pulse width modulator circuit.

In practice, such current limitation can be incorporated in a conventional pulse-width modulator (PWM) circuit, as shown in FIG. 6. It can be seen here that the current I delivered to the integrator is measured by means of a shunt 50 at the bottom of the inverter. The associated switch is controlled by the output Q of an RS bistable 51 that has two reset (R) inputs, a first supplied by the pulse modulation stage and a second supplied by the current limitation stage.

Figure 7:
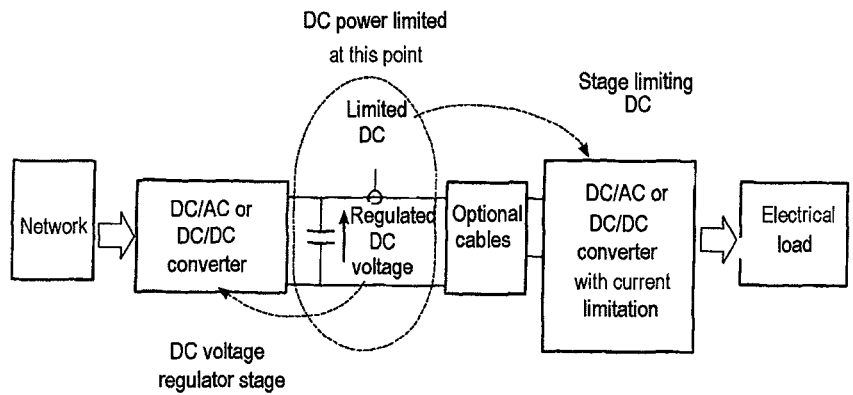
FIG. 7 is a diagram showing a power-limiter device incorporating current limitation of the invention that is interposed between a power supply network and a load.

Current limitation of the invention may also be associated with voltage limitation in order to control power consumption, as shown in FIG. 7.

The invention is not limited to the above description, but on the contrary covers any variant coming within the ambit defined by the claims. In particular, although it is stated that it is the current I coming from the filtering of the current delivered by the power supply that is integrated, it is possible more generally to integrate an image of the current supplied by the power supply, e.g. the power supply current itself or a current derived from the power supply current, such as the filtered current I.

What is claimed is:

1. A method of limiting a current $i_{dc}$ supplied by a DC power supply, the method comprising:

interposing a switching stage between the power supply and a load, the switching stage including a controllable switch in series with a freewheel diode; and periodically controlling the switch so that for each period of duration T, the following averaged quantity $$\frac{1}{T}\int_o^T i \cdot dt$$

is calculated in which i is a current that is an image of the power supply current $i_{ds}$, the averaged quantity being reset to zero at the beginning of each period, with the switch being caused to be closed so long as said averaged quantity remains below a predetermined current threshold $i_{thresh}$, and with the switch being caused to be open, otherwise, said method being implemented by a power converter including a plurality of arms, each of which arm comprises two switching cells in series, each cell comprising a controlled switch connected in parallel with a diode, wherein, for the duration of the period T, a switch in one of the cells of one of the arms is kept closed while a switch of another one of the cells in another one of the arms is controlled in application of the periodic control step.

2. A method according to claim 1, wherein the image current i is a current I obtained by differential filtering of the power supply current.

3. A method according to claim 1, wherein the switch control signal is an output from a comparator that compares the output from a resettable integrator with a current setpoint equal to the threshold current $i_{thresh}$, the integrator receiving as input the current that is an image of the power supply current.

* * * * *